Sept. 9, 1941.　　　　H. HELBIG　　　　2,255,040
LAWN PERFORATING MACHINE
Filed Sept. 14, 1939　　　3 Sheets-Sheet 1

Inventor
H. Helbig
By
Attorneys

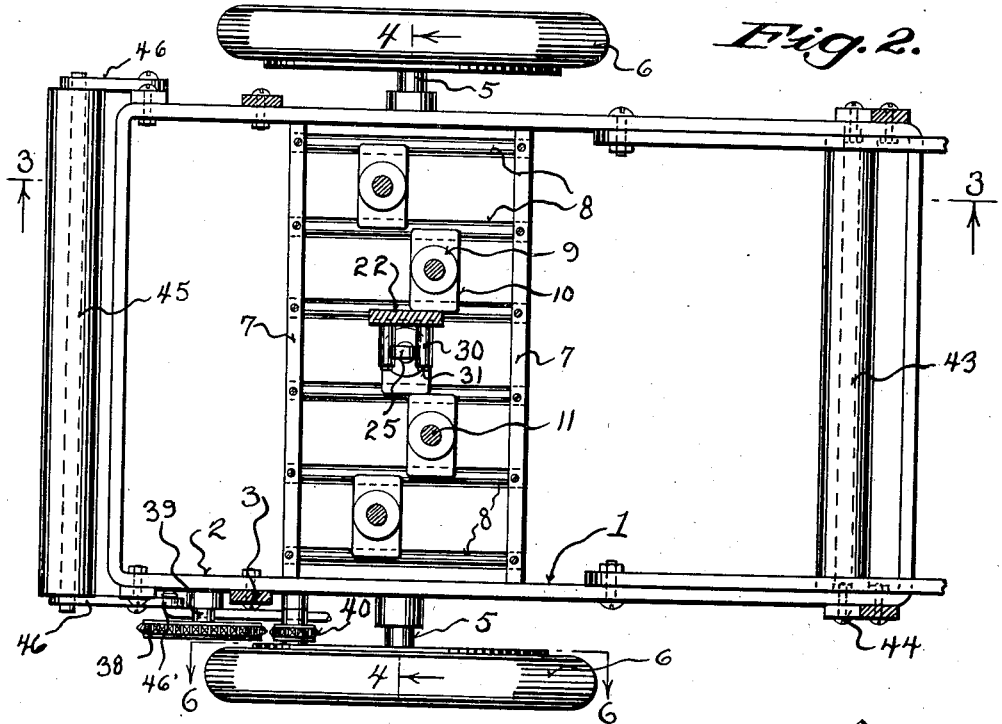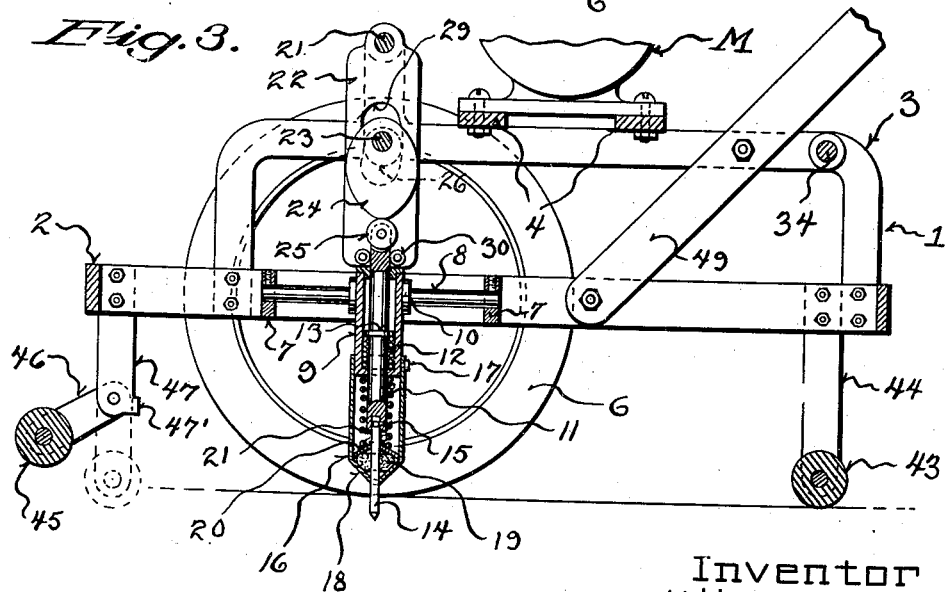

Sept. 9, 1941. H. HELBIG 2,255,040
LAWN PERFORATING MACHINE
Filed Sept. 14, 1939 3 Sheets-Sheet 3

Inventor
H. Helbig
By
Attorneys

Patented Sept. 9, 1941

2,255,040

UNITED STATES PATENT OFFICE 2,255,040

LAWN PERFORATING MACHINE

Hugo Helbig, Racine, Wis.

Application September 14, 1939, Serial No. 294,861

2 Claims. (Cl. 97—44)

This invention pertains to a lawn perforating machine, and has primarily for its object to provide a comparatively simple, compact, and inexpensive power-driven machine for rapidly spiking or perforating a large expanse of lawn, such as is found in parks, golf courses, cemeteries, and large estates.

It is common practice amongst lawn-keepers to frequently perforate lawns by spiking the same at closely spaced intervals with various kinds of sharp tools to allow admission of air and prevent the ground from becoming hard and sour, with resulting "brown patch." Another advantage derived from lawn perforating resides in the fact that more effective fertilization and irrigating of the ground is accomplished.

Heretofore, perforating or spiking of lawns has required a tedious, awkward operation, and, therefore, the present invention has primarily for its object to provide a power-operated and propelled lawn perforating machine, controlled and guided by an operator, for rapidly and uniformly perforating large expanses of lawn, without tearing or mutilating the same, the machine being readily portable for transportation.

Incidental to the foregoing, a more specific object of the invention resides in the provision of a power-operated lawn perforating machine, in which the perforating spikes have simultaneous vertical and horizontal movement with relation to the machine, whereby the spikes are projected into and withdrawn from the sod in a fixed vertical plane during travel of the machine, thus preventing tearing and mutilation of the lawn.

Another object resides in the provision of means for cleaning and stripping ground from the spikes as they are withdrawn from the soil.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 2 is a plan section taken on the line 2—2 of Figure 4.

Figure 3 is a longitudinal section taken on the line 3—3 of Figure 2.

Figure 1:
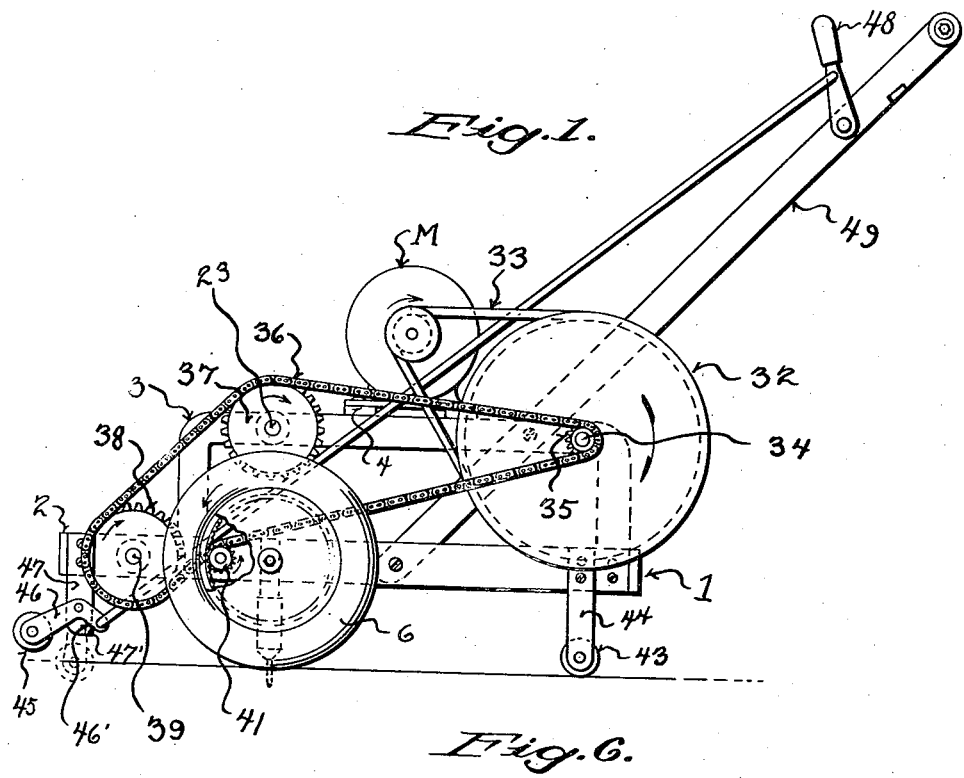
Figure 1 is an elevation of a machine incorporating the principles of the present invention.
Figure 6:
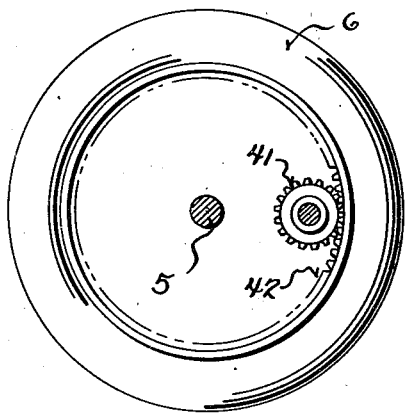
Figure 6 is a detail of a propelling drive for the machine.
Figure 4:
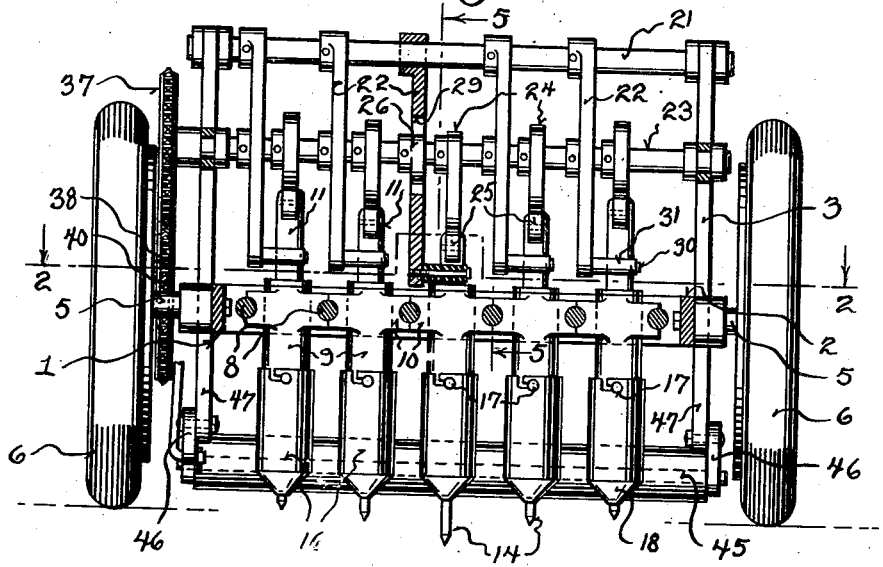
Figure 4 is a transverse section taken on the line 4—4 of Figure 2.
Figure 5:
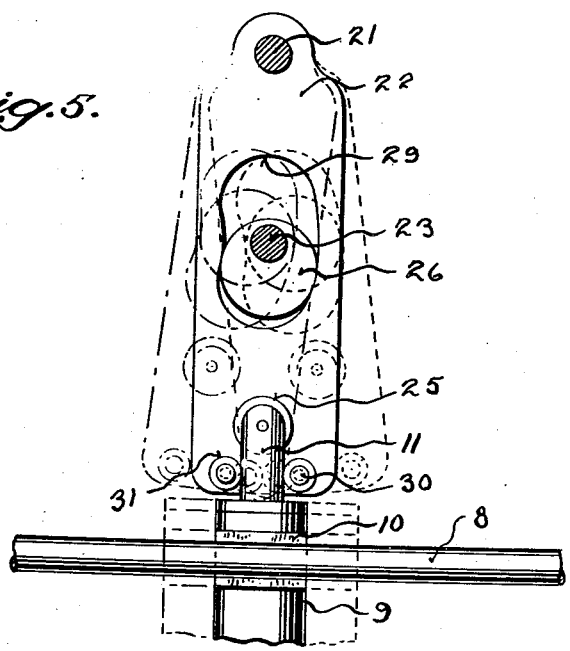
Figure 5 is an enlarged, fragmentary detail taken on the line 5—5 of Figure 4.

Referring now more particularly to the accompanying drawings, the numeral 1 designates generally a frame comprising a rectangular body 2 and raised, longitudinal supporting arms 3 connected to the sides of the body 2. As best shown in Figure 3, the arms 3 are connected intermediate their ends by transverse braces 4, which support a motor M, which may be either an electric motor or an internal combustion engine, for both propelling the machine and actuating the perforating spikes.

Secured to the side stretches of the body 2 are stub axles 5 upon which supporting wheels 6 are mounted, the axles preferably being in transverse alinement with the horizontal, longitudinal path of movement of the perforating spikes, as best indicated in Figure 2.

A pair of spaced cross members 7 are connected to the sides of the body 2, and serve to carry a plurality of spaced longitudinal bars 8, which serve as guides and supports for horizontally reciprocated brackets 9 provided with laterally extending bosses 10 notched on their outer edges to receive the rods 8.

As best shown in Figure 3, vertically mounted within the brackets 9 are vertical reciprocating plungers 11, normally urged to raised position by springs 12 housed within the brackets and opposing collars 13 secured upon the plungers.

Detachably secured within the lower end of the plungers 11 are perforating spikes 14 locked within the plungers by set screws 15, which facilitates replacement or removal of the spikes for sharpening.

Inasmuch as the spikes are designed to be projected into the ground or sod during the perforating operation, it is desired to wipe and clean the same as they are withdrawn, thus preventing the accumulation of muck, which would eventually unduly deface the surface of the lawn. This is accomplished by means of a stripper 16 in the form of a tube detachably secured to the lower end of each bracket 9 by a bayonet slot formed in the top edge of the tube for engagement with headed pins 17 carried by the brackets. The tube is provided with a conical lower end 18, which embraces the spikes 14 carried by the reciprocative plunger, and seated within the lower end of the stripper and snugly engaging the spike is a packing disc 19 formed of felt or other compressible material. A conical washer 20 positioned over the gasket and opposed by a spring 21 serves to compress and hold the gasket in position, as a spike 14 is reciprocated through the same.

Positioned above the plungers 11 and journaled in extensions carried by the side arms 3 is a transverse shaft 21, upon which a plurality of oscillating arms 22 are mounted. Below the shaft 21 another transverse shaft 23 is journaled in the side arms 3 of the frame and has secured thereon a plurality of cams 24, each alined with one of the plungers and engaging a roller 25 carried by the top of the plunger for controlling reciprocative movement of the plungers, as will be later described in connection with the operation of the machine.

Also mounted upon the shaft 23 are eccentrics 26, which operate in arcuate slots 29 formed in the arms 22 to impart uniform oscillatory movement to the same. As best shown in Figures 2 and 3, the lower ends of the arms 22 are provided with spaced, laterally projecting studs 30, covered with resilient cushioning sleeves 31, which straddle and engage the plungers 11 to impart horizontal reciprocative movement to the brackets 10 upon oscillatory movement of the arms 22.

While any form of transmission may be employed for propelling the machine and actuating the plungers, one simple form of drive has been shown, including a driven pulley 32 connected with the motor M by a belt 33 and mounted upon the transverse shaft 34 carried by the arms 3. A pinion 35 operatively connected with the pulley 32 serves to drive a chain 36, which is trained over a sprocket 37, secured to one end of the cam shaft 23. The sprocket 37 chain-travels over a sprocket 38 mounted on a stub shaft 39 carried by one side of the body 2; and, as best shown in Figure 1, the return stretch of the chain 36 is trained over a sprocket 40 journaled in the side of the body and operatively connected with a pinion 41 engaging an internal gear 42 carried by the adjacent supporting wheel 6.

The rear end of the frame 1 is supported upon a transverse roller 43 carried by depending arms 44 secured to the sides of the body.

To facilitate portability of the machine when not in use, a supporting roller 45 is carried by a pair of links 46 pivotally connected to depending brackets 47 secured to the sides of the machine adjacent its forward end. One of the links is provided with a crank-arm 46' connected with a lever 48 mounted upon a handle 49 secured to the frame 1. In operative position, the handle 49 is set in the position shown in Figure 1, which raises the roller 45 to allow the supporting wheel 6 to engage the ground, in which position the crank-arm 46', engaging a lug 47' formed on one of the depending brackets 47, limits the upward movement of the roller 45.

For transporting the machine, the roller 45 is swung downwardly by the lever 48, which raises the front end of the frame 1 to lift the supporting wheels 6 from the ground. Consequently, in transporting the machine, the operator is not required to actuate the plungers or transmission drive.

In operation, it will be apparent that as the machine is propelled forward by the motor drive, the plungers 11, and, consequently, the spikes 14 carried thereby, will be vertically reciprocated by the cams 24, and simultaneous with vertical reciprocative movement of the plungers, the brackets 9 will be horizontally reciprocated on the guide bars 8 by the oscillatory arms 22 and the eccentric cams 26. Due to the fact that simultaneous vertical and horizontal movement of the plungers is in timed relation with the travel of the machine, it will be readily understood that as the machine moves over the ground, the spikes will be projected into the ground by the action of the cams 24, and at the same time shifted horizontally and longitudinally on the machine by the eccentrics 26, until such time as the spikes are withdrawn, as a result of which reciprocative movement of the spikes occurs in a fixed plane with relation to the ground, but movable relative to the frame of the machine.

From the foregoing explanation considered in connection with the accompanying drawings, it will be seen that a simple, compact, power-actuated machine has been provided to materially facilitate the perforations of lawns without tearing or mutilating the sod, and while a specific structure and principle of operation has been illustrated and described in considerable detail, it is to be understood that various mechanical means may be devised for driving the machine and imparting desired simultaneous vertical and horizontal movement to the spikes in timed relation to the travel of the machine, without departing from the invention.

I claim:

1. A lawn perforating machine comprising, a frame, a power unit mounted on said frame, frame-supporting wheels driven by said power unit, a plurality of plungers provided with spikes and mounted on said frame for vertical and horizontal reciprocative movement, and cam means operatively connected with said power unit for imparting simultaneous vertical and horizontal movement to said plungers in timed relation to the travel of said machine for projecting and withdrawing said spikes from a lawn in a fixed vertical plane during movement of said machine.

2. A lawn perforating machine comprising, a frame, a power unit mounted on said frame, frame-supporting wheels driven by said power unit, a plurality of plungers provided with spikes and mounted on said frame for vertical and horizontal reciprocative movement, cam means operatively connected with said power unit for imparting simultaneous vertical and horizontal movement to said plungers in timed relation to the travel of said machine for projecting and withdrawing said spikes from a lawn in a fixed vertical plane during movement of said machine, and means for wiping said spikes upon withdrawal from the ground to prevent the accumulation of muck.

HUGO HELBIG.